April 26, 1927.
J. H. REED
1,625,957
METHOD OF APPLYING FASTENERS
Filed Feb. 2, 1923
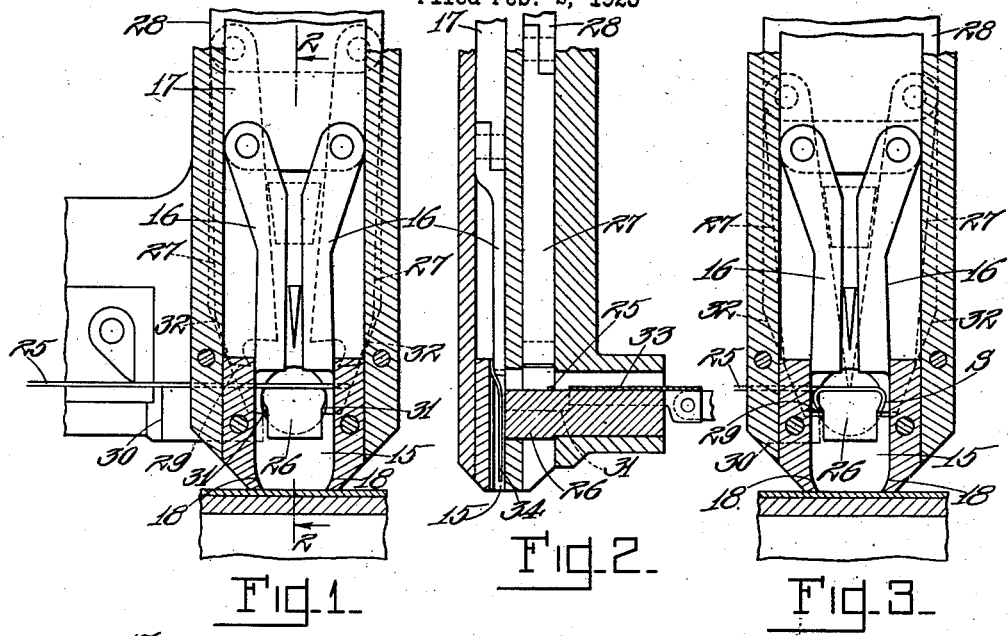
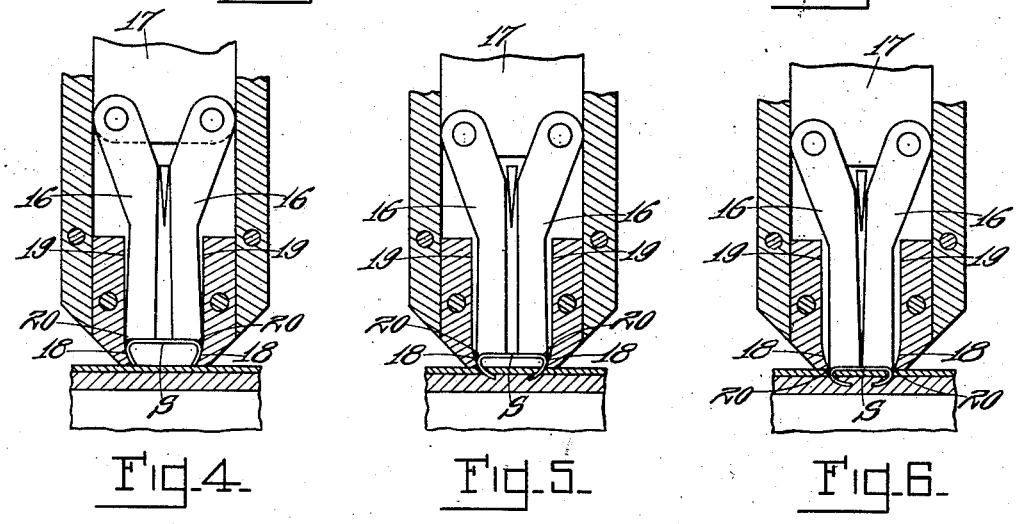
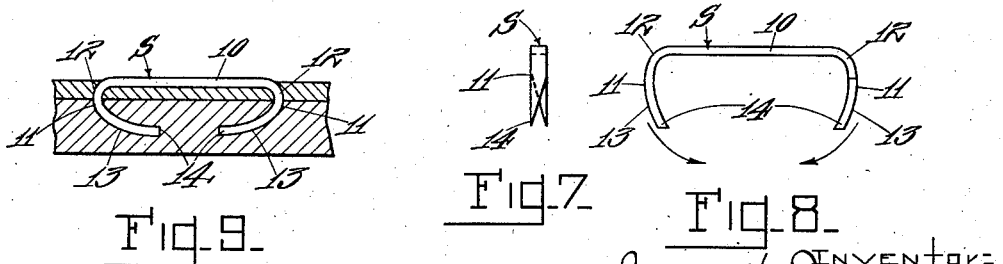

Patented Apr. 26, 1927.

1,625,957

UNITED STATES PATENT OFFICE.

JAMES H. REED, OF SWAMPSCOTT, MASSACHUSETTS, ASSIGNOR, BY MESNE ASSIGN-
MENTS, TO UNITED SHOE MACHINERY CORPORATION, OF PATERSON, NEW JERSEY,
A CORPORATION OF NEW JERSEY.

METHOD OF APPLYING FASTENERS.

Application filed February 2, 1923. Serial No. 616,621.

This invention relates to the insertion of metallic fasteners into work for various purposes, as, for example, to attach two pieces of material together, and has for its general object to provide a method whereby fasteners, such, for example, as staples, may be so driven as to be clinched or anchored within the body of the work and be securely retained therein without completely penetrating the same, thereby producing what may be termed a metallic blind-stitch seam. The method is therefore particularly adapted, although by no means limited, to the manufacture of McKay shoes for the purpose of securing the upper to the insole in lieu of the usual lasting tacks which are left in the shoe, which must be suitably clinched within the shoe, but which nevertheless frequently work up into the shoe to the great discomfort of the wearer. Such a shoe forms the subject of Letters Patent No. 1,512,041 granted on my application on Oct. 21, 1924.

For the purposes in view the invention provides a novel method of applying fasteners whereby the shank of a fastener is deflected in the driving operation to anchor it in the work by engaging it on that side of the work from which the fastener is driven. As herein illustrated the legs of a staple, as they are forced into the work, are thus deflected positively toward each other, relatively to the portions of the staple head that are respectively adjacent thereto, until they become securely anchored in the work without penetrating entirely through it. To facilitate the anchoring of the staple in the desired manner, it may be formed, as also herein illustrated, with shanks or legs so curved that portions adjacent to the head diverge from each other while their ends or points are inclined or converge inwardly toward each other. As the staple so formed is driven, the converging ends of the legs are deflected toward each other to enter the work in paths that are inclined to the adjacent surface of the work, and other portions of the legs also are deflected progressively by bending them relatively to the head so that they follow the paths taken by their points or ends.

The more particular objects of the present invention and the manner in which they are accomplished will best be understood from the following description of one form of fastener and the preferred manner of forming and driving the same, as illustrated in the accompanying drawings. It will be understood, however, that the particular fastener and instrumentalities shown, and the particular operations described, have been chosen for illustrative purposes merely, and that the invention, as defined by the claims hereunto appended, may be otherwise practiced without departure from its spirit and scope.

In said drawings:

Fig. 1 is a somewhat diagrammatic sectional view of instrumentalities operating in accordance with the invention, showing the same at the beginning of the staple forming and driving operations.

Fig. 2 is a section taken substantially on the line 2—2, Fig. 1.

Fig. 3 is a view similar to Fig. 1, showing the parts in the position occupied thereby after the formation of a staple.

Figs. 4, 5 and 6 are similar views, with the staple forming devices omitted, illustrating the manner of driving the staple.

Figs. 7 and 8 are enlarged detail views taken at right angles to each other of the staple formed in the manner illustrated in Figs. 1 and 3.

Fig. 9 is a similar view showing the staple as driven in the manner illustrated in Figs. 4 to 6, the work being shown in section.

The staple S herein shown (see particularly Fig. 8) is of the type disclosed and claimed in Letters Patent No. 1,512,040, granted upon my application on October 21, 1924. Said staple comprises a substantially straight head or top 10 terminating at each end in a shank, leg or prong 11 which preferably is curved as illustrated. The illustrated shanks 11 are concave toward each other, and comprise portions 12 adjacent to said head which diverge from each other and portions 13 which converge toward their pointed ends 14, the arrangement being such that the maximum width of the staple, measured across the shanks 11 at points thereon between the portions 12 and 13, is greater than the width of the head 10 or the distance between the pointed ends 14 while said pointed ends are directed slightly toward each other.

The staple above described is preferably formed from a blank cut from a continuous wire or strip 25 which is suitably fed over a forming anvil 26, the blanks being severed from said wire and suitably bent about said anvil by a pair of formers 27 pivotally secured to a plunger 28 reciprocated by suitable mechanism, not shown. The lower end of one of the formers 27 constitutes a movable cutter 29 which cooperates with a fixed cutter 30 to shear the blanks from the wire or strip when the plunger 28 descends. The anvil 26 is formed with lateral undercut shoulders 31 about which the ends of a blank are bent, in order to form the shanks 11 above described, by means of the formers 27 which are suitably shaped and are moved toward each other for this purpose as they descend by means of suitable fixed cam surfaces 32 which are engaged by said formers on their operative stroke.

Each staple, after being formed as above described, is moved from the anvil 26 by means of a slide 33 into a driving throat 15 in which it is temporarily held by springs 34 and through which it is driven by means of a driver comprising a pair of driving members 16 pivoted or otherwise mounted for lateral movement upon a plunger 17 which is reciprocated by any suitable means, not shown. The throat 15 has an open end of a width substantially equal to the width of the head 10 of the staple, and consequently less than the maximum width of the staple measured across the shanks. Adjacent to said open end, said throat is formed with oppositely disposed walls 18 which converge toward said open end and are preferably so curved as substantially to conform to the shape of the portions 13 of the staple shanks, said curved concave portions 18 merging into straight parallel portions 19 spaced substantially to correspond to the maximum width of the staple and adapted to guide the same into driving position. The driving members 16 are provided at the outer sides of their lower ends with projections 20 which engage said shank portions 12 laterally as the staple is driven.

In Figure 1, the wire or strip 25 is shown as fed forward over the forming anvil 26, the driving and forming members being raised. As the formers 27 descend, a blank is severed from the wire or strip by the movable cutter 29 acting against the fixed cutter 30, and said formers bend the ends of the blank about the shoulders 31 on the anvil 26, as shown in Figure 3, said formers being moved inwardly during their descent by the fixed cam surfaces 32. The slide 33 is then moved forwardly to push the formed staple from the anvil 26 into the throat 15, where it is held by the springs 34. As the driving members 16 thereafter descend, the staple is forced downwardly through the throat 15, as shown in Fig. 4, and the pointed ends 14 of said staple are caused to enter the work, being, however, simultaneously deflected laterally toward each other relatively to the head of the staple by the curved converging portions 18 of the walls of the the throat 15 so that they enter the work in paths inclined to that surface of the work which they penetrate. As the operation continues, as illustrated in Fig. 5, causing the portions 13 of the shanks 11 adjacent to the ends 14 to be forced into the work, said portions will also be progressively deflected inwardly toward each other relatively to the portions of the staple head that are respectively adjacent thereto as they enter the work. The arrangement is such as to cause the pointed ends 14 and adjacent portions of the shanks to pass into the work along or parallel to the curved lines generally indicated by the arrows on Fig. 8, the portions 12 of the shanks adjacent to the head 10 being gradually bent to form smaller angles with the head as this movement continues. The desired movement and bending of the shanks along the curved lines indicated is insured, and buckling prevented, by the portions 20 of the driving members 16, which portions, after the points of the staple have entered the work, engage the curved portions 18 of the walls of the throat so as to give to said driving members progressively increasing movements in lateral directions toward each other and thus contract the driver as a whole. This operation causes the staple to be compressed laterally, the shanks 11 being forced toward each other so as to enable the staple to pass through the contracted open end of the throat, and supplies a progressively increased lateral component to the driving force, which is thereby applied to the shanks in directions substantially parallel to the directions of movement of the pointed ends 14 during their penetration of the work. Each shank being forced laterally to the proper extent at two points, one adjacent to and the other removed from the work, namely, at the points of engagement with the shanks of the portions 18 of the throat and the portions 20 of the driver, the movement of the points along the curved lines mentioned, and the consequent clinching of the staple, are insured. As the driver reaches the forward limit of its movement, as shown in Fig. 6, the head 10 of the staple passes through the open end of the throat, the portions 13 of the shanks 11 thereof having been brought into positions substantially parallel with the head 10, being therefore clinched or anchored in the work although spaced from the side thereof opposite that from the staple was driven, and the portions 12 of said shanks having been brought into positions of substantial parallelism substantially perpendicular to the head 10.

It will be seen that, by the method described, the staple may be driven part way only through the work but nevertheless be securely clinched or anchored within the latter by means of a clinching member (namely, the portions 18 of the throat 15) located on the same side of the work as the driver, and which acts, at a side of the work from or into which the staples are driven, to force the points and shanks thereof toward each other. The necessity of a clinching anvil at the opposite side of the work from the driver is therefore obviated, and said last named side of the work left unmarred by the anvil and unbroken by the points of the staples which are thoroughly sheathed within the body of the material, so as to be incapable of working out and doing damage. It will also be seen that the method described is further capable of advantageous use in connection with work of greater thickness than the length of the staple shanks, or with work whose side opposite that from which the staples are driven is inaccessible, so as to prevent the clinching of the shanks by ordinary means, said shanks being, in accordance with the present method, securely clinched within the body of the work by engaging them at the side thereof from which they are driven.

The staple forming and driving mechanism herein shown, and referred to in the foregoing description of the method constituting the present invention, is not claimed herein, being covered by the claims of another application filed July 2, 1923, Serial No. 648,935.

Having thus described my invention, I claim:—

1. The method of driving and anchoring staples which consists in applying driving force to the head of a staple and, while forcing the legs of the staple into the work, deflecting them relatively to the portions of the head that are respectively adjacent thereto to anchor them in the work by engaging them on that side of the work from which the staple is driven.

2. The method of driving and anchoring staples which consists in applying driving force to the head of a staple, and substantially throughout the staple-driving operation progressively deflecting the legs of the staple relatively to the portions of the head that are respectively adjacent thereto by engaging them positively on that side of the work from which the staple is driven.

3. The method of driving and anchoring staples which consists in applying driving force to the head of a staple and, while forcing the legs of the staple into the work, deflecting them toward each other relatively to the portions of the head that are respectively adjacent thereto and in paths substantially inclined to the adjacent surface of the work by engaging them on that side of the work from which the staple is driven.

4. The method of driving and anchoring fasteners which consists in applying driving force to the head of a fastener and, as the shank of the fastener is forced into the work, deflecting it progressively relatively to the head to anchor it in the work by applying thereto at that side of the work from which the fastener is driven a force acting in a direction transverse to that of the driving force.

5. The method of utilizing fasteners which consists in forming a fastener having a head portion and a shank with its end laterally deflected relatively to the head, applying driving force to the head of the fastener thus formed and, while driving the fastener into the work, further deflecting relatively to the head the end and other portions of the shank progressively to anchor the fastener in the work by engaging it on that side of the work from which it is driven.

6. The method of driving and anchoring staples which consists in applying driving force to the head of a staple, deflecting the ends of the staple legs relatively to the head in the staple-driving operation to cause them to enter the work in paths substantially inclined to the surface which they penetrate and, while the ends are being forced into the work, bending portions of the legs that are adjacent to the head in the same directions that the ends are deflected.

7. The method of driving and anchoring staples which consists in applying driving force to the head of a staple, deflecting the ends of the staple legs relatively to the head in the staple-driving operation by engaging them positively on that side of the work from which the staple is driven to cause them to enter the work in paths substantially inclined to the adjacent surface of the work, and thereafter deflecting other portions of the staple legs relatively to the head as they enter the work to cause them to follow the paths taken by the ends of the legs.

8. The method of driving and anchoring staples which consists in forcing a staple into the work and, as it is forced into the work, deflecting the staple legs toward each other positively in curved paths by bending them relatively to the portions of the head of the staple that are respectively adjacent thereto through force applied at that side of the work from which the staple is driven.

9. The method of driving and anchoring staples having substantially straight heads which consists in applying driving force to the head of a staple and, while maintaining the head substantially straight, deflecting the legs of the staple relatively to the head as they are forced into the work by engaging them on that side of the work from which the staple is driven.

10. The method of driving and anchoring staples which consists in applying driving force to the head of a staple and, by engaging the staple legs exteriorly of the work in the driving operation, deflecting them relatively to the head in such degree as to anchor them within the substance of the work without penetrating that surface of the work which is on the opposite side from that where they enter it.

11. The method of driving and anchoring staples which consists in applying driving force to the head of a staple and, while driving the staple into the work, applying to the staple legs exteriorly of the work forces acting in directions transverse to the line of drive upon different portions of the legs successively before the different respective portions enter the work to deflect them relatively to the head in such degree as to anchor them within the substance of the work without penetrating that surface of the work which is on the opposite side from that where they enter it.

12. The herein described method of applying staples which consists in providing a staple with shanks having converging ends and driving the same into the work while deflecting said ends toward each other relatively to the portions of the staple head that are respectively adjacent thereto by engaging them at the side of the work from which said staple is driven.

13. The herein described method of applying staples which consists in providing a staple with a substantially straight head and converging shanks and driving the same into substantially flat work while forcing said shanks toward each other by engaging them at points spaced from the work at that side of the work from which the staple is driven.

14. The herein described method of applying staples which conssits in providing a staple with shanks having converging ends and thereafter driving the same into the work while deflecting said shanks toward each other by engaging them at points adjacent to the work at the side thereof from which the staple is driven and simultaneously also, at points spaced from the work at the same side thereof.

15. The herein described method of applying staples which consists in providing a staple with shanks which diverge adjacent to the head of the staple and converge toward their ends, and driving said staple while deflecting said ends toward each other.

16. The herein described method of applying staples which consists in providing a staple with shanks which diverge adjacent to the head of the staple and converge toward their ends, and driving said staple while forcing said shanks toward each other by engaging them at points spaced from the work at that side of the work from which the staple is driven.

17. The herein described method of applying staples which consists in providing a staple with shanks which diverge adjacent to the head of the staple and converge toward their ends, and driving said staple while forcing said shanks toward each other by engaging them at points spaced from the work and simultaneously also at points adjacent to the work at that side of the work from which the staple is driven.

In testimony whereof I affix my signature.

JAMES H. REED.